United States Patent
Raith

(10) Patent No.: US 6,633,754 B1
(45) Date of Patent: Oct. 14, 2003

(54) SYSTEMS AND METHODS FOR INCREASING EMERGENCY CALL ACCESS SPEED IN RADIOCOMMUNICATION SYSTEMS

(75) Inventor: Alex K. Raith, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/843,752

(22) Filed: Apr. 22, 1997

(51) Int. Cl.⁷ ............................................. H04M 11/00
(52) U.S. Cl. ................................... 455/404.1; 455/434
(58) Field of Search ................................. 455/404, 527, 455/434, 515, 450, 62

(56) References Cited

U.S. PATENT DOCUMENTS

| | | | | |
|---|---|---|---|---|
| 4,916,728 A | * | 4/1990 | Blair | 455/455 |
| 5,175,867 A | | 12/1992 | Wejke et al. | 455/33.1 |
| 5,193,091 A | * | 3/1993 | Crisler et al. | 455/450 |
| 5,303,285 A | * | 4/1994 | Kerihuel et al. | 379/114 |
| 5,327,144 A | | 7/1994 | Stilp et al. | 342/387 |
| 5,337,342 A | * | 8/1994 | Kruger et al. | 455/404 |
| 5,353,332 A | | 10/1994 | Raith et al. | 379/59 |
| 5,404,355 A | * | 4/1995 | Raith | 370/311 |
| 5,408,684 A | * | 4/1995 | Yunoki et al. | 455/434 |
| 5,465,388 A | * | 11/1995 | Zicker | 455/404 |
| 5,499,386 A | | 3/1996 | Karlsson | 455/33.2 |
| 5,570,411 A | * | 10/1996 | Sicher | 455/450 |
| 5,661,471 A | * | 8/1997 | Kotlicki | 340/825.37 |
| 5,675,630 A | * | 10/1997 | Beatty | 455/551 |
| 5,684,859 A | * | 11/1997 | Chanroo et al. | 455/433 |
| 5,732,125 A | * | 3/1998 | Oyama | 455/404 |
| 5,742,666 A | * | 4/1998 | Alpert | 340/426 |
| 5,774,807 A | * | 6/1998 | Yazaki et al. | 455/434 |
| 5,794,147 A | * | 8/1998 | Huang | 455/434 |
| 5,862,485 A | * | 1/1999 | Linneweh, Jr. et al. | 455/450 |
| 5,884,148 A | * | 3/1999 | Bilgic et al. | 455/74.1 |

FOREIGN PATENT DOCUMENTS

EP             370826        5/1990

OTHER PUBLICATIONS

Louis A. Stilp, "*Time Difference of Arrival Technology for Locating Narrowband Cellular Signals*", Proceedings of the SPIE, vol. 2602, pp. 134–144 (1996).
International Search Report re PCT/US98/06624 Date of mailing of search: Nov. 9, 1998.

* cited by examiner

*Primary Examiner*—Nguyen T. Vo
(74) *Attorney, Agent, or Firm*—Myers Bigel Sibley & Sajovec

(57) ABSTRACT

The handling of emergency calls, e.g., 911 calls, should be performed on an expedited basis. Various techniques are described herein to expedite system access to radiocommunication systems when processing an emergency call. For example, control channel locking, origination message content, and retransmission rules are modified to reduce access time.

23 Claims, 5 Drawing Sheets

| RACH MESSAGES | SUBCHANNEL RACH |
|---|---|
| AUDIT CONFIRMATION | X |
| AUTHENTICATION | X |
| BASE STATION CHALLENGE ORDER | X |
| BSMC MESSAGE DELIVERY | X |
| CAPABILITY REPORT | X |
| MACA REPORT | X |
| ORIGINATION | X |
| PAGE RESPONSE | X |
| QUEUE DISCONNECT | X |
| R-DATA | X |
| R-DATA ACCEPT | X |
| R-DATA REJECT | X |
| REGISTRATION | X |
| SERIAL NUMBER | X |
| SOC MESSAGE DELIVERY | X |
| SPACH CONFIRMATION | X |
| SSD UPDATE ORDER CONFIRMATION | X |
| TEST REGISTRATION | X |
| UNIQUE CHALLENGE ORDER CONFIRMATION | X |

FIG. 3

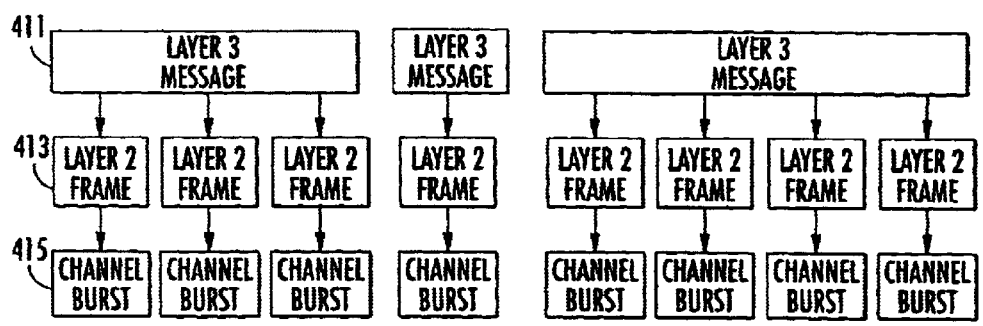

FIG. 4

SYSTEMS AND METHODS FOR INCREASING EMERGENCY CALL ACCESS SPEED IN RADIOCOMMUNICATION SYSTEMS

BACKGROUND

Applicant's invention relates generally to radiocommunication systems, e.g., cellular or satellite systems and, more particularly, to techniques for supporting and enhancing emergency calling procedures in such systems.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that access to the radiocommunication system be as fast as possible so that an emergency service center can respond quickly to the user's request for assistance.

Consider, solely for the purposes of example, the prevalent digital cellular radiotelephone system in North America known as the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). D-AMPS is a TDMA cellular radiotelephone system wherein each radio channel is divided into a series of time slots, each of which contains a burst of information from a data source, e.g., a digitally encoded portion of a voice conversation. The time slots are grouped into successive TDMA frames having a predetermined duration. According to IS-54B, each TDMA frame consists of six consecutive time slots and has a duration of 40 milliseconds (msec). Thus, each frame can carry from one to six channels (e.g., one to six radio connections).

Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVCs) and TDMA digital traffic channels (DTCs), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

The IS-54-B standard also provides for a number of analog control channels (ACC) on which system accesses can be initiated and system overhead information can be communicated to the mobile units. A subsequent standard, referred to as IS-136, adds specifications for digital control channels (DCCs).

Conventional access procedures calls vary from system to system but typically include the following basic steps. First, when a mobile unit is turned on, it locates a control or access channel over which it can receive paging messages and other overhead information and over which it can send messages to initiate a call. As radiocommunication systems grow more complex, e.g., due to the increasing customer base and limited bandwidth available to provide additional capacity, a greater number of control channels tend to be operative in any given geographic area. Accordingly, systems (such as those defined by IS-54B and IS-136) have established criteria which define the location and selection process that a mobile unit will follow when locking onto a control channel. These procedures, however, may result in a mobile station finding a first control channel but not locking to that control channel since it fails to meet the selection criteria and then searching for and evaluating one or more additional control channels before a suitable candidate is found.

Additional delay in accessing the system may be associated with the signaling defined by these various systems for originating a call from the mobile unit, i.e., the process of acquiring a traffic channel. When a mobile subscriber initiates a call, e.g., by dialing a telephone number and pressing the "send" button on the mobile unit, the mobile unit transmits the dialed number and its mobile identity number (MIN) and an electronic serial number (ESN) over the control channel to the base station. The ESN is a factory-set, "unchangeable" number designed to protect against the unauthorized use of the mobile station. The base station forwards the received numbers to the MSC, which validates the mobile station, selects an AVC or DTC, and establishes a through-connection for the call as described above. However, the mobile unit may also be required to send other messages, e.g., an authentication message, as part of the call origination process. These additional messages introduce further delay in the call set-up process since an access attempt is not deemed successful until all messages are transmitted, which delay may be an acceptable trade-off for non-emergency calls given the benefits (e.g., reduction in fraud) associated therewith, but which may be unacceptable for emergency system access.

Moreover, each message required by the system for call set-up requires additional bursts to be transmitted by the mobile unit and correctly received by the base station. Since the various mobile units attempt system access using control channels on a contention basis, sometimes two mobile unit's bursts will collide on a same sub-portion of a control channel. Thus, radiocommunication systems provide feedback to the mobile units regarding the success or failure of their transmitted access bursts. This information is used by the mobile units to determine if retransmission of a particular burst or bursts is necessary, which retransmission procedure is also predefined by the system and which may introduce still further delay in the assignment of a traffic channel and subsequent relaying of the emergency call from the mobile unit to the base station.

Accordingly, it would be desirable to provide techniques whereby access to radiocommunication systems could be accelerated for emergency calls placed by mobile units.

SUMMARY

According to exemplary embodiments of the present invention, various techniques are described to accelerate a mobile unit's access to a radiocommunication system when the mobile unit is placing an emergency call. For example, according to one exemplary embodiment, the process by which a mobile station locks to a control channel may be expedited by ignoring certain criteria which are normally used to evaluate control channels when a mobile unit is powered-on and an emergency call is placed.

According to another exemplary embodiment, emergency access may be expedited by reducing the number of messages which are transmitted by the mobile unit as part of the call origination process. For example, an authentication message may be omitted for emergency access since it may be desirable to process a request for emergency assistance regardless of the authenticity of the equipment or validity of the subscription by which the emergency call is placed. By transmitting less data during emergency call accesses, faster and more reliable system access is achieved.

According to a still further exemplary embodiment of the present invention, retransmission rules may be adjusted or ignored by a mobile unit making an emergency call access. For example, a mobile unit may continuously retry erroneously received transmission bursts, rather than waiting for a predetermined time in accordance with conventional retransmission rules, to accelerate system access.

BRIEF DESCRIPTION OF THE DRAWINGS

The features and advantages of Applicant's invention will be understood by reading this description in conjunction with the drawings, in which:

FIG. 3 illustrates a format for a call origination message according to IS-136;

FIG. 4 depicts the relationship between Layer 1, Layer 2 and Layer 3 data packaging;

DETAILED DESCRIPTION

The following description is scripted in terms of a cellular radiotelephone system, but it will be understood that Applicant's invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, while the exemplary embodiments described below are provided in the context of Time Division Multiple Access (TDMA) communication systems, and in particular IS-136, it will be understood by those skilled in the art that the present invention may be applied to systems using any access methodology, e.g,. Frequency Division Multiple Access (FDMA), Code Division Multiple Access (CDMA) and hybrids of FDMA, TDMA and/or CDMA, as well as those which are defined by any system standard, e.g., GSM, PDC, AMPS, etc.

Figure 1:
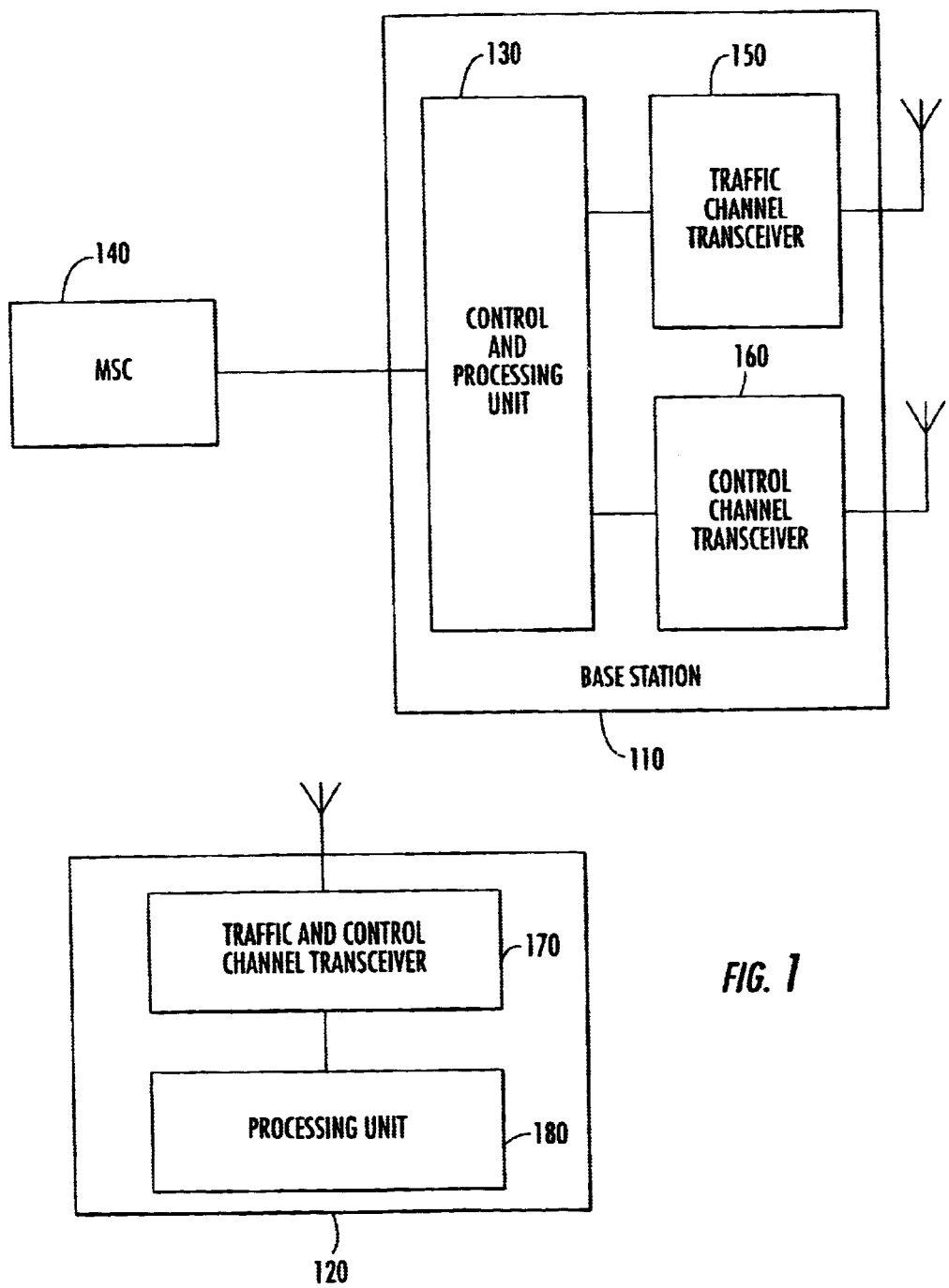
FIG. 1 illustrates an exemplary base station and mobile unit which may operate in accordance with the present invention.

FIG. 1 represents a block diagram of an exemplary cellular mobile radiotelephone system, including an exemplary base station 110 and mobile unit 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. Pat. No. 5,745,523 to Dent et al., entitled "Multi-Mode Signal Processing," both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile unit 120 has located a control channel, e.g., by using digital control channel location information found on a traffic channel, it can then read the control information transmitted on that control channel, e.g., paging messages, using its traffic and control channel transceiver 170. For more detailed information relating to techniques for locating digital control channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. When a connection between the mobile station 120 and the system is desired, the transceiver 170 will tune to a traffic channel assigned thereto by the system.

Figure 2:
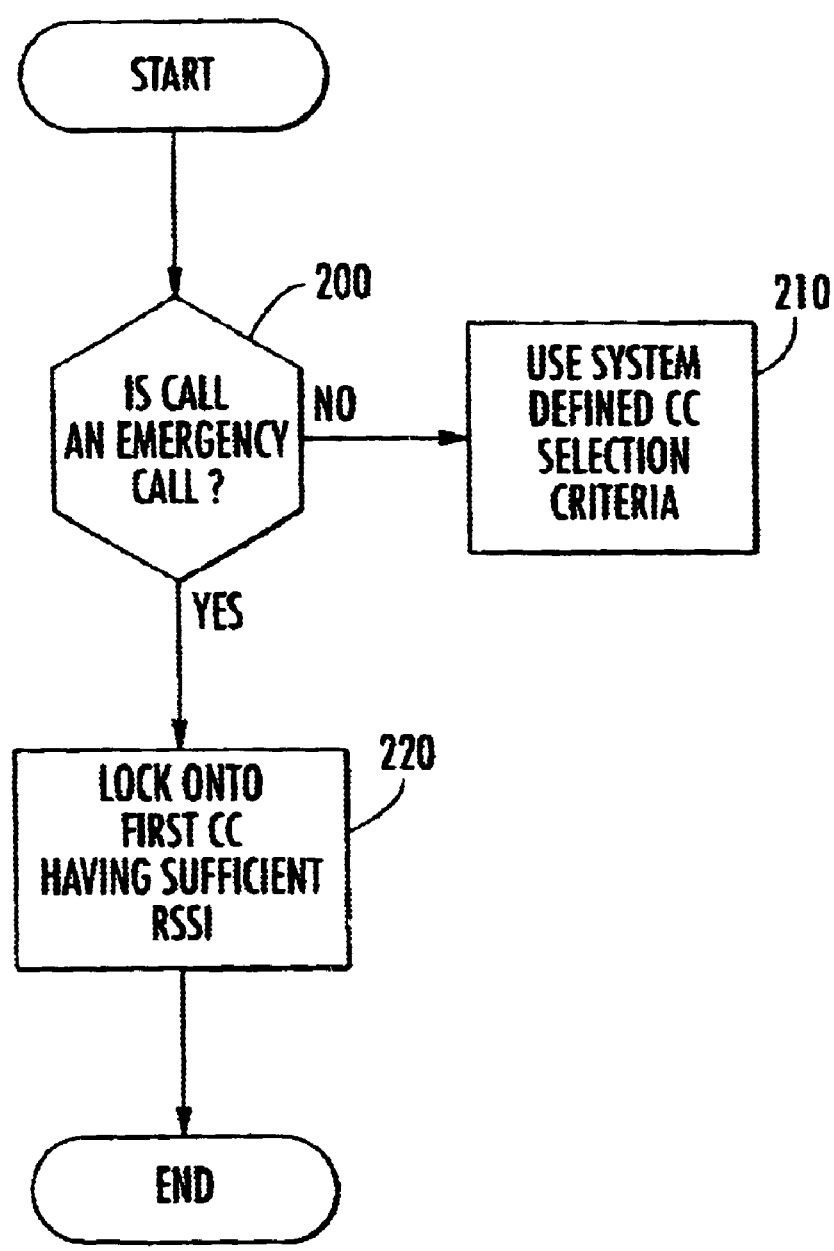
FIG. 2 is a flow chart illustrating a method for locking to a control channel according to an exemplary embodiment of the present invention.

However, according to exemplary embodiments of the present invention, when the mobile unit 120 is making an emergency access, the techniques used to access the system are different than those conventional techniques used for non-emergency system accesses. For example, at power-on, if the mobile unit recognizes that an emergency call has been initiated by the mobile unit's user, then the process by which it locks onto a control channel can be varied. An exemplary method for locking onto a control channel according to the present invention is now described with respect to FIG. 2. Initially, at block 200, the remote unit first determines whether the call is an emergency call. Various exemplary techniques for identifying a call as an emergency call are described in U.S. patent application Ser. No. 08/839,860 entitled "Systems and Methods for Identifying Emergency Calls in Radiocommunication Systems", filed on Apr. 22, 1997, the disclosure of which is expressly incorporated here by reference, and the interested reader is referred thereto for more details. Briefly, however, the mobile unit can be provided with a data base having all possible emergency call numbers. Then, each time a number is dialed into the mobile unit, that number can be compared with the data base or list of emergency numbers to determine if the call is an emergency call.

Another alternative, which limits the burden on correctly programming the mobile units, is for the system to broadcast the local emergency number. This number can then be displayed to the user on a display associated with the mobile unit, for example, whenever the emergency number(s) change as the mobile unit moves from cell to cell. Yet another technique for identifying emergency calls is to provide a special button, key or key sequence for the mobile unit that is associated with emergency calls. In this exemplary implementation, the user simply presses this button, key or key sequence to initiate contact with an emergency service center.

Regardless of the technique by which the mobile unit determines if a call is an emergency call or not, for non-emergency calls the flow proceeds to block 210, wherein "normal" rules for control channel selection as defined by the system, For example, in addition to some minimum received signal strength (RSSI), the mobile may further evaluate an identified control channel with regard to certain system preferences stored in the mobile unit. These preferences may include, for example, whether the cell is barred with respect to that mobile (as described in IS-136), or whether the cellular operator is not the preferred operator (using the System Operator Code (SOC) in IS-136) and whether the cell provides desired services.

If, on the other hand, the call placed by the mobile user is an emergency user, then the mobile unit will enter an emergency processing mode wherein it will lock onto a control channel using a subset of the criteria normally required for listening to a particular control channel. For example, as indicated at step 220, the mobile unit may only require that the control channel be received at a sufficient RSSI in order to lock onto that control channel and begin accessing the system. In this way control channel acquisition time can be reduced during an emergency call access.

Once the mobile unit locks onto a control channel, it will request system access on the uplink portion thereof. According to systems defined by IS-136, for example, this typically means transmitting a plurality of the possible Random Access CHannel (RACH) messages illustrated in FIG. 3. For example, a mobile unit may transmit an Authentication message, a Capability Report message, a MACA Report message and an Origination message as part of its access attempt. However, every message transmitted to set-up a call may require a plurality of transmit bursts depending upon the length of the message. The following provides a brief description of the way in which origination messaging is packaged and transmitted according to IS-136. However, the interested reader is directed to U.S. Pat. No. 5,610,917, entitled "Layer 2 Protocol for the Random Access Channel and the Access Response Channel", the disclosure of which is expressly incorporated here by reference, for more information.

FIG. 4 schematically illustrates pluralities of Layer 3 messages 411, Layer 2 frames 413, and Layer 1 channel bursts, or time slots, 415. Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 4, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

Figure 5:
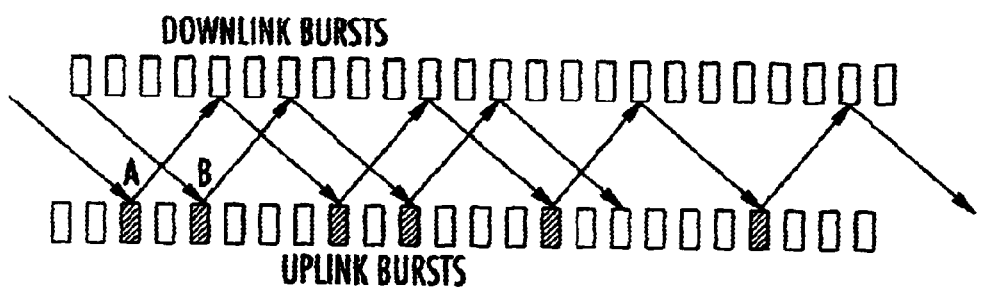
FIG. 5 shows access bursts and feedback on uplink and downlink control channels, respectively.

As noted above, when more than one channel burst is required to send a Layer 3 message, the several bursts are not usually consecutive bursts on the radio channel. Since time is required to receive, process and react to a received burst, the bursts required for transmission of a Layer 3 message can be sent in a staggered format as illustrated in FIG. 5. Therein, path A illustrates the communications between a mobile unit and the system. In this example, the mobile unit uses every sixth uplink channel burst to transmit a Layer 3 message to the system.

Figure 6:
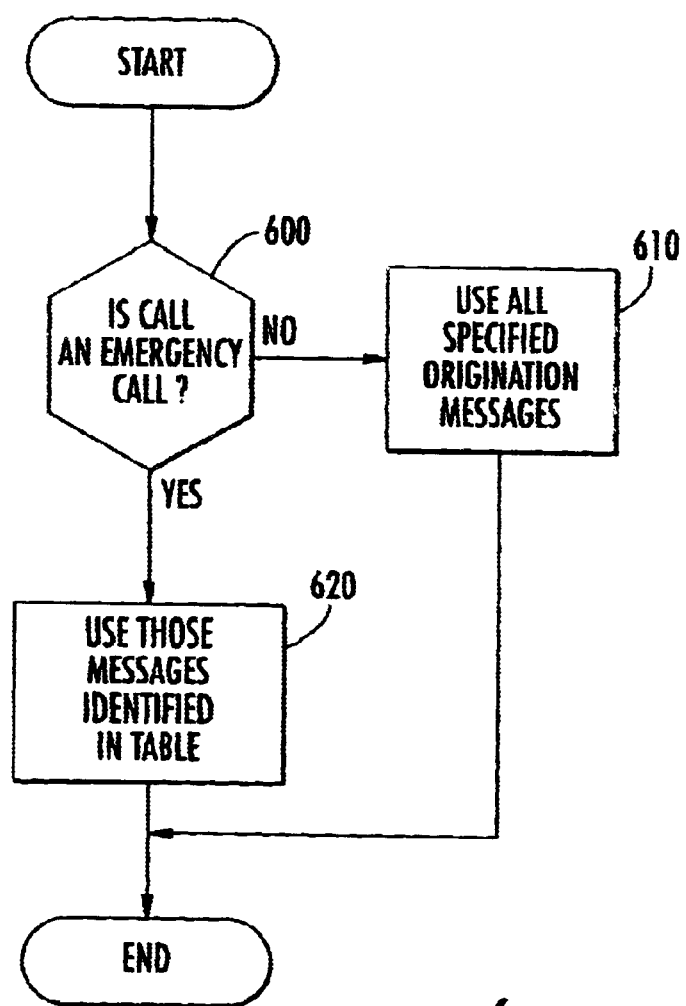
FIG. 6 is a flow chart illustrating a technique for adjusting the content of a call origination message according to a second exemplary embodiment of the present invention.

Thus, those skilled in the art will appreciate that by reducing the number of messages transmitted by the mobile unit during call origination, the number of transmit bursts is reduced and, therefore, the access time is also reduced and access reliability is increased. This can be accomplished by, for example, providing a table in the mobile station which lists those messages to be sent (or those not to be sent) when a mobile station makes an emergency access. The table can identify a subset of the available messages, e.g., a subset of those messages illustrated in FIG. 3, which may be used during an emergency access. For example, the Authentication message and Capability Report message could be omitted from the table. Thus, an exemplary call origination process according to this exemplary embodiment of the present invention can be illustrated by the flow chart of FIG. 6.

Therein, at block 600, the mobile station determines whether the call is an emergency call as described above. If not, then the "normal" call origination messages are used as defined by the relevant system standards or operator at step 610. Otherwise, the mobile station's table is consulted at block 620 to determine what subset of messages are to be used for emergency call origination and these messages are then transmitted to the system.

Yet another exemplary embodiment of the present invention further improves emergency call access time by modifying the access rules employed by radiocommunication systems. For example, although various mobile units may use different time slots on the uplink control channel to attempt access, since this is a random access, it will sometimes be the case that mobile units' transmissions "collide" when they transmit to the system during the same time slot on the uplink control channel. Thus, radiocommunication systems provide feedback to the mobile units indicating the reception status of bursts previously sent on the uplink control channel.

For example, systems defined in accordance with IS-136 provide a field called the Shared Channel Feedback (SCF) field on the downlink control channel which are read by mobile units having a pending access. Various flags are included in this field which indicate reception status of a previous burst, as well as the availability status of corresponding uplink control channel time slots for subsequent access bursts.

When a burst is not properly received by the base station due to a collision, negative feedback is provided via the SCF flags. The mobile units may be programmed to react in various ways to this negative feedback. For example, a common feature is to let a mobile that did not receive a positive response to randomly wait for a number of access events before trying again. Thus, collision management results in delay.

If the mobile unit is attempting to access the system to place an emergency call, however, this delay may be unacceptable. Thus, according to this exemplary embodiment of the present invention, a mobile unit that has detected an emergency call request bypasses the normal access rules. For example, if a collision resolving protocol would, using the standard protocol associated with the system of interest, be invoked such that an access delay is involved, the mobile unit will instead continue to attempt to access the system as frequently as possible given processing constraints. That is, for a TDMA system, the mobile unit would continue to send access bursts in the next feasible uplink control channel time slot. This idea can be extended so that a mobile unit making an emergency call access also deliberately transmits in an access event slot even when the system has indicated that the channel is "busy", i.e., assuming that the mobile unit making the emergency access can overcome the other mobile unit's transmission using higher power.

Figure 7:
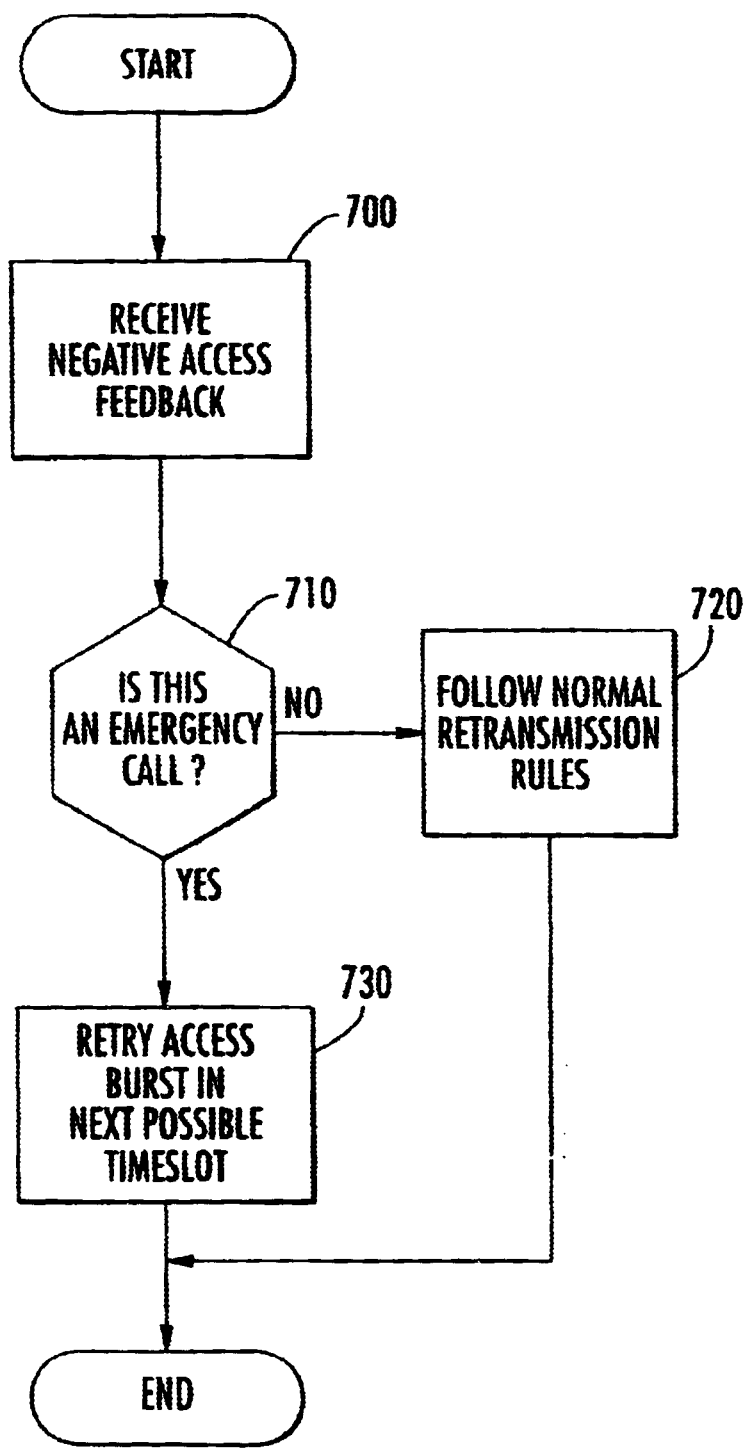
FIG. 7 is a flow chart illustrating selective use of retransmission rules according to a third exemplary embodiment of the present invention.

Thus, this exemplary embodiment of the present invention can be summarized by way of the flow chart of FIG. 7. Therein, after negative feed back is received from the system regarding an access attempt at block 700, the mobile checks to see if the access is an emergency access at block 710. Of course, this may have been performed previously, e.g., when formulating the origination message as described above. If this is not an emergency access, then the mobile unit uses the normal, i.e., system specified, retransmission rules at block 720. Otherwise, the flow proceeds to block 730, where the mobile unit ignores standard retransmission protocols in favor of attempting to retry transmission more rapidly, e.g., at the next feasible uplink control channel time slot.

Moreover, as described in the above-incorporated U.S. Patent Application related to emergency call identification, it may be desirable for the radiocommunication system to broadcast emergency numbers. In addition thereto, the system could also broadcast an indicator associated with each emergency number (e.g., 911, 811, etc.) as to which of the foregoing techniques was applicable when a user accesses the system using that number. For example, the system might indicate that all of the techniques could be used to expedite access when the user dials 911, but that the mobile unit would only reduce its access message set and not ignore retransmission rules when it recognizes an 811 emergency access.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for locking to a control channel in a radiocommunication system comprising the steps of:
   storing a set of preferences for evaluating candidate control channels in a remote station;
   identifying, in said remote station, a call to be placed as an emergency call;
   ignoring said set of preferences when evaluating a control channel for said emergency call; and
   locking to said control channel if said control channel is received by said remote station at a predetermined signal strength.

2. The method of claim 1, wherein said step of identifying the call to be placed as an emergency call comprises the step of:
   comparing a telephone number associated with the call to be placed with a database of possible emergency call numbers.

3. The method of claim 1, wherein said step of identifying the call to be placed as an emergency call comprises the steps of:
   broadcasting a number associated with emergency calls to the remote station; and
   comparing a number associated with the call to be placed with the broadcasted number.

4. The method of claim 1, wherein said step of identifying the call to be placed as an emergency call comprises the step of:
   determining whether a key or key sequence associated with emergency calls has been actuated.

5. The method of claim 1, wherein said set of preferences includes whether a cell associated with the control channel is barred with respect to the remote station.

6. The method of claim 1, wherein said set of preferences includes whether a cellular operator associated with the control channel is not a preferred operator.

7. The method of claim 1, wherein the set of preferences includes whether a cell associated with said control channel provides services desired by the remote station.

8. A remote station comprising:
   a receiver for receiving data over an air interface;
   a memory for storing preferences associated with control channel selection; and
   a processor for determining if a call is an emergency call and, based on a result of said determination, selectively ignoring said stored preferences and commanding said receiver to listen to a control channel which is received at a predetermined received signal strength.

9. The remote station of claim 8, further comprising:
   a database of possible emergency call numbers, wherein said processor compares a telephone number associated with the call with said database to determine whether the call is an emergency call.

10. The remote station of claim 8, wherein said determination is based upon a comparison between a number associated with the call and a number broadcast to the remote station.

11. The remote station of claim 8, further comprising:
    a key, wherein said call is determined to be an emergency call by said processor if said key is actuated.

12. The remote station of claim 8, wherein said set of preferences includes whether a cell associated with the control channel is barred with respect to the remote station.

13. The remote station of claim 8, wherein said set of preferences includes whether a cellular operator associated with the control channel is not a preferred operator.

14. The remote station of claim 8, wherein the set of preferences includes whether a cell associated with said control channel provides services desired by the remote station.

15. The remote station of claim 8, further comprising:
    a table which lists messages to be sent when the remote station places the emergency call.

16. The remote station of claim 15, wherein the messages to be sent when the remote station places the emergency call are random access channel (RACH) messages.

17. The remote station of claim 15, wherein the table of messages to be sent when the remote station places the emergency call is a message selected from the group consisting of:
    audit confirmation, authentication, base station challenge order, BSMC message delivery, capability report, MACA report, origination, page response, queue disconnect, R-DATA, R-DATA ACCEPT, R-DATA REJECT, registration, serial number, system operator code message delivery, SPACH confirmation, SSD update order confirmation, test registration, unique challenge order confirmation.

18. The remote station of claim 8, further comprising:

a table which lists messages which are not to be sent when the remote station places the emergency call.

19. The remote station of claim 18, wherein said messages which are not to be sent include an Authentication message and a Capability Report message.

20. A system for locking to a control channel in a radiocommunication system comprising:

means for storing a set of preferences for evaluating candidate control channels in a remote station;

means for identifying, in said remote station, a call to be placed as an emergency call;

means for ignoring said set of preferences when evaluating a control channel for said emergency call; and means for locking to said control channel if said control channel is received by said remote station at a predetermined signal strength.

21. The system of claim 20, wherein said means for identifying the call to be placed as an emergency call comprises:

means for comparing a telephone number associated with the call to be placed with a database of possible emergency call numbers.

22. The system of claim 20, wherein said means for identifying the call to be placed as an emergency call comprises:

means for broadcasting a number associated with emergency calls to the remote station; and means for comparing a number associated with the call to be placed with the broadcasted number.

23. The system of claim 20, wherein said means for identifying a call to be placed as an emergency call comprises:

means for determining whether a key or key sequence associated with emergency calls has been actuated.

\* \* \* \* \*